(12) United States Patent
Bryan, Jr. et al.

(10) Patent No.: US 7,695,220 B2
(45) Date of Patent: Apr. 13, 2010

(54) TRANSPORT SYSTEM FOR FRUIT AND LIKE OBJECTS

(75) Inventors: Vincent E. Bryan, Jr., Quincy, WA (US); Alex E. Kunzler, Issaquah, WA (US); Joseph A. Penaranda, Renton, WA (US); Jeffrey A. Cleveringa, Ephrata, WA (US); Randy Allard, Germantown, TN (US); Daniel Baker, Seattle, WA (US); Vincent E. Bryan, III, Mercer Island, WA (US)

(73) Assignee: Picker Technologies LLC, Mercer Island, WA (US)

( * ) Notice: Subject to any disclaimer, the term of this patent is extended or adjusted under 35 U.S.C. 154(b) by 0 days.

(21) Appl. No.: 12/055,209

(22) Filed: Mar. 25, 2008

(65) Prior Publication Data

US 2008/0279640 A1 Nov. 13, 2008

Related U.S. Application Data

(60) Provisional application No. 60/920,069, filed on Mar. 26, 2007, provisional application No. 60/949,630, filed on Jul. 13, 2007.

(51) Int. Cl.
*B65G 53/58* (2006.01)
(52) U.S. Cl. .................. 406/84; 406/191; 56/328.1
(58) Field of Classification Search .................. 406/83, 406/84, 195–197, 36, 10, 191–193; 193/7
See application file for complete search history.

(56) References Cited

U.S. PATENT DOCUMENTS

| 1,114,318 A | 10/1914 | Vasey |
| 1,626,402 A | 4/1927 | Fryman |

(Continued)

FOREIGN PATENT DOCUMENTS

WO WO 00/62594 10/2000

OTHER PUBLICATIONS

Fox, Robert W. and McDonald, Alan T., Introduction to Fluid Mechanics, Purdue University School of Mech. Eng., John Wiley & Sons, 4th Ed., pp. 124, 380-384, 633, New York, NY: 1992.

(Continued)

*Primary Examiner*—Gene Crawford
*Assistant Examiner*—William R Harp
(74) *Attorney, Agent, or Firm*—Todd S. Parkhurst, Esq.; Hughes Socol Piers Resnick & Dym Ltd.

(57) ABSTRACT

A device for transporting articles is disclosed. In the illustrated and described embodiment of the invention, the articles are fruit such as apples, and the articles can be transported from a picking location on a fruit tree to a collection bin or other site. The device includes a tube member adapted to receive and transport the articles, and a plurality of deformable baffles at spaced-apart locations within the tube. Each baffle defines an aperture which permits the article to engage and deform the baffle and aperture so as to move through the aperture and down the tube. The article is urged through the tube by a pressure differential created across the article. In the described and illustrated embodiment of the invention, this pressure differential is a pneumatic pressure differential.

32 Claims, 15 Drawing Sheets

U.S. PATENT DOCUMENTS

| | | | |
|---|---|---|---|
| 2,288,682 A | | 7/1942 | Chittenden |
| 2,545,072 A | | 3/1951 | Denman |
| RE23,524 E | | 7/1952 | Denman |
| 2,650,464 A | * | 9/1953 | Bernheim .................. 56/328.1 |
| 2,680,338 A | | 6/1954 | Space |
| 2,711,625 A | | 6/1955 | Bullock |
| 2,775,088 A | * | 12/1956 | Bullock ...................... 56/332 |
| 2,968,907 A | | 1/1961 | Bernheim et al. |
| 3,165,880 A | * | 1/1965 | Buie, Jr. ...................... 56/336 |
| 3,348,647 A | | 10/1967 | Gates et al. |
| 3,413,787 A | | 12/1968 | Van Antwerp et al. |
| 3,460,327 A | * | 8/1969 | Johnson et al. ............ 56/328.1 |
| 3,460,330 A | | 8/1969 | Black, Jr. |
| 3,464,529 A | | 9/1969 | Horsky, Jr. |
| 3,473,312 A | | 10/1969 | Holt |
| 3,489,258 A | * | 1/1970 | Stokes ........................... 193/7 |
| 3,507,107 A | | 4/1970 | Harms et al. |
| 3,538,695 A | | 11/1970 | Carnell |
| 3,559,387 A | | 2/1971 | Myers |
| 3,564,826 A | * | 2/1971 | Middleton ................. 56/328.1 |
| 3,584,442 A | | 6/1971 | White |
| 3,591,949 A | | 7/1971 | Connery |
| 3,664,104 A | | 5/1972 | Jamshidi |
| 3,756,001 A | | 9/1973 | Macidull |
| 3,767,268 A | * | 10/1973 | Stucky ........................ 119/844 |
| 3,854,273 A | | 12/1974 | Rosenberg |
| 3,898,785 A | | 8/1975 | Chew |
| 3,913,307 A | | 10/1975 | Cardinal, Jr. |
| 3,934,691 A | * | 1/1976 | Toloczko ..................... 193/32 |
| 3,969,878 A | | 7/1976 | Morganeier |
| 4,000,602 A | | 1/1977 | Cardinal, Jr. |
| 4,320,995 A | | 3/1982 | Tennes et al. |
| 4,388,798 A | | 6/1983 | Gerber |
| 4,394,259 A | | 7/1983 | Benny et al. |
| 4,476,670 A | * | 10/1984 | Ukai et al. .................. 56/328.1 |
| 4,491,212 A | | 1/1985 | Gray, Jr. |
| 4,501,113 A | | 2/1985 | Gerber |
| 4,558,561 A | | 12/1985 | Mendenhall |
| 4,674,265 A | | 6/1987 | Gerber |
| 4,704,851 A | | 11/1987 | Manor |
| 4,750,602 A | | 6/1988 | Souda |
| 5,007,772 A | | 4/1991 | McKenna et al. |
| 5,125,223 A | | 6/1992 | McKenna et al. |
| 5,205,677 A | * | 4/1993 | McKenna .................... 406/39 |
| 5,280,697 A | | 1/1994 | Miller |
| 5,319,911 A | | 6/1994 | Wilhite |
| 5,599,157 A | | 2/1997 | Ellington |
| 5,840,102 A | | 11/1998 | McCracken |
| 5,878,562 A | | 3/1999 | Cernusco |
| 6,182,431 B1 | | 2/2001 | Balchen |
| 6,371,711 B1 | * | 4/2002 | Berger ........................ 414/160 |
| 6,827,529 B1 | | 12/2004 | Berge et al. |
| 6,840,715 B2 | * | 1/2005 | Crovara Pescia ............ 406/92 |
| 2005/0172595 A1 | | 8/2005 | Wells et al. |
| 2008/0010961 A1 | | 1/2008 | Gray |

OTHER PUBLICATIONS

Brennan, J. "Beach Pneumatic: Alfred Beach's Pneumatic Subway and the Beginnings of Rapid Transit in New York." May 2004, web publ. at http://www.columbia.edu/~brennan/beach/.

ISR PCT/US08/058151.

* cited by examiner

TRANSPORT SYSTEM FOR FRUIT AND LIKE OBJECTS

This application claims priority from U.S. provisional patent application 60/920,069 filed Mar. 26, 2007; and from U.S. provisional patent application Ser. No. 60/949,630 filed Jul. 13, 2007.

BACKGROUND OF THE INVENTION

This invention relates generally to systems for transporting small objects, and more particularly relates to pneumatic transport systems.

Presently in the fruit industry, most specifically in the apple industry, fruit is traditionally handpicked. The pickers carefully place the fruit in apple bags which are worn on the shoulders of the pickers, extending downward over the chest and abdomen to the groin. The pickers then gently release the fruit into large bins for later transport to a packing or processing plant. This technique provides for the "on-tree" selection by the picker of the appropriate fruit (apples) for picking utilizing the visually discernible criteria of color size and quality. Good pickers remove the fruit from the tree while keeping the stem intact on the fruit so as to maintain the integrity of the following years fruiting bud on the tree. On occasion, the picking operations must contend with the clipping of overly stiff or long stems; the gentle placement of the fruit into the picking bag to prevent bruising; and the transfer and delivery of the fruit to a larger size container better adapted for truck transport. Fruit located on high limbs may require that the picker climb a ladder or stand on a scaffold to reach the fruit. The fruit bins are usually placed in the row between tree lines and spaced so that they can be filled by apples transferred from the picker's bag within the shortest walking distance. The bins are then picked up by an apple trailer pulled by a tractor and taken to a common holding site awaiting forklift placement onto a flatbed truck.

This fruit picking process results in about 30% of the picker's time actually picking fruit, with the remaining 70% of the time gently placing the fruit into bags or bins after having clipped the stems when required, moving and climbing up and down ladders, carrying fruit from one place to another, then walking to and carefully releasing the picker's bag load of apples into the collecting bin taking special care not to cause a blemish or bruise on the fruit by rough handling. The picker's bag load may weigh 40 pounds or more leading to fatigue of the picker and a reduction in efficiency.

Due to the seasonal nature of the fruit harvest, fruit pickers are frequently found amongst migrant worker groups often from countries outside the United States. As a result of stringent U.S. immigration policies, a sufficient numbers of pickers may not be available to pick the fruit at harvest time. Due to the slowness of the fruit handpicking process, large numbers of pickers are required when the fruit reaches the proper point of ripeness. Since individual productivity is low when fruit is handpicked, wages remain low for the individual picker. This in turn results in the propagation of a population of below average wage earners.

It is an objective of this invention to improve the productivity of the individual picker while maintaining the advantages of the hand picking process, namely: selectivity of fruit to be picked, gentleness to prevent bruising at all stages of movement and packing and stem trimming when needed is desirable.

To accomplish this objective, a system involving specially modified and augmented pneumatic tubes is presented.

DESCRIPTION OF THE DRAWINGS

FIG. 3a is an elevational view showing a typical apple picker and his apple picking station, and suggesting how the station can be moved relative to the platform upon which the station is mounted.

DETAILED DESCRIPTION

While the invention will be described in connection with a preferred embodiment and procedure, it will be understood that it is not intended to limit the invention to this embodiment or procedure. On the contrary, it is intended to cover all alternatives, modifications and equivalents as may be included within the spirit and scope of the invention as defined by the appended claims.

Figure 1:
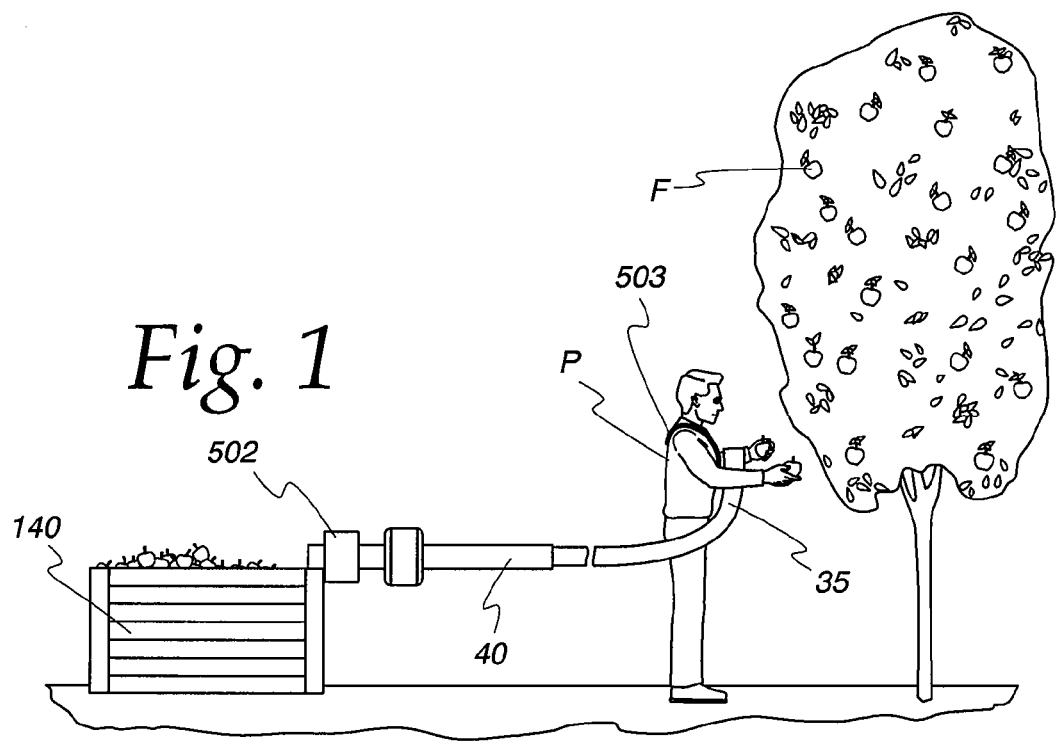
FIG. 1 is an elevational view showing an exemplary apple picker who is picking apples from a tree and depositing the apples in an embodiment of the invention for transport to an apple collection bin.
Figure 2:
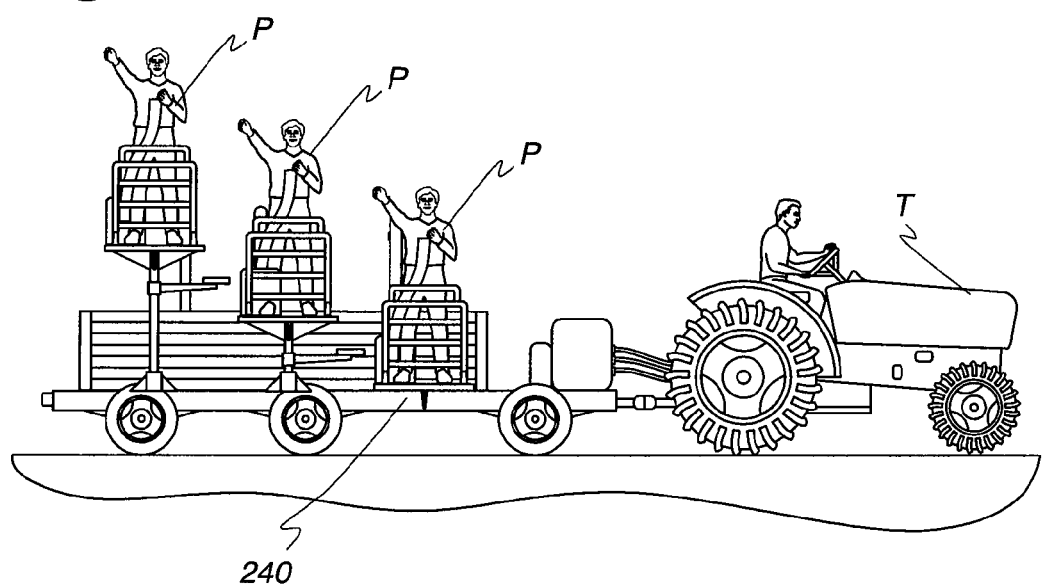
FIG. 2 is an elevational view showing a tractor and trailer upon which are mounted apple picking stations being used by apple pickers who are depositing the picked apples in an embodiment of the invention for transport to an apple collection bin.
Figure 3:
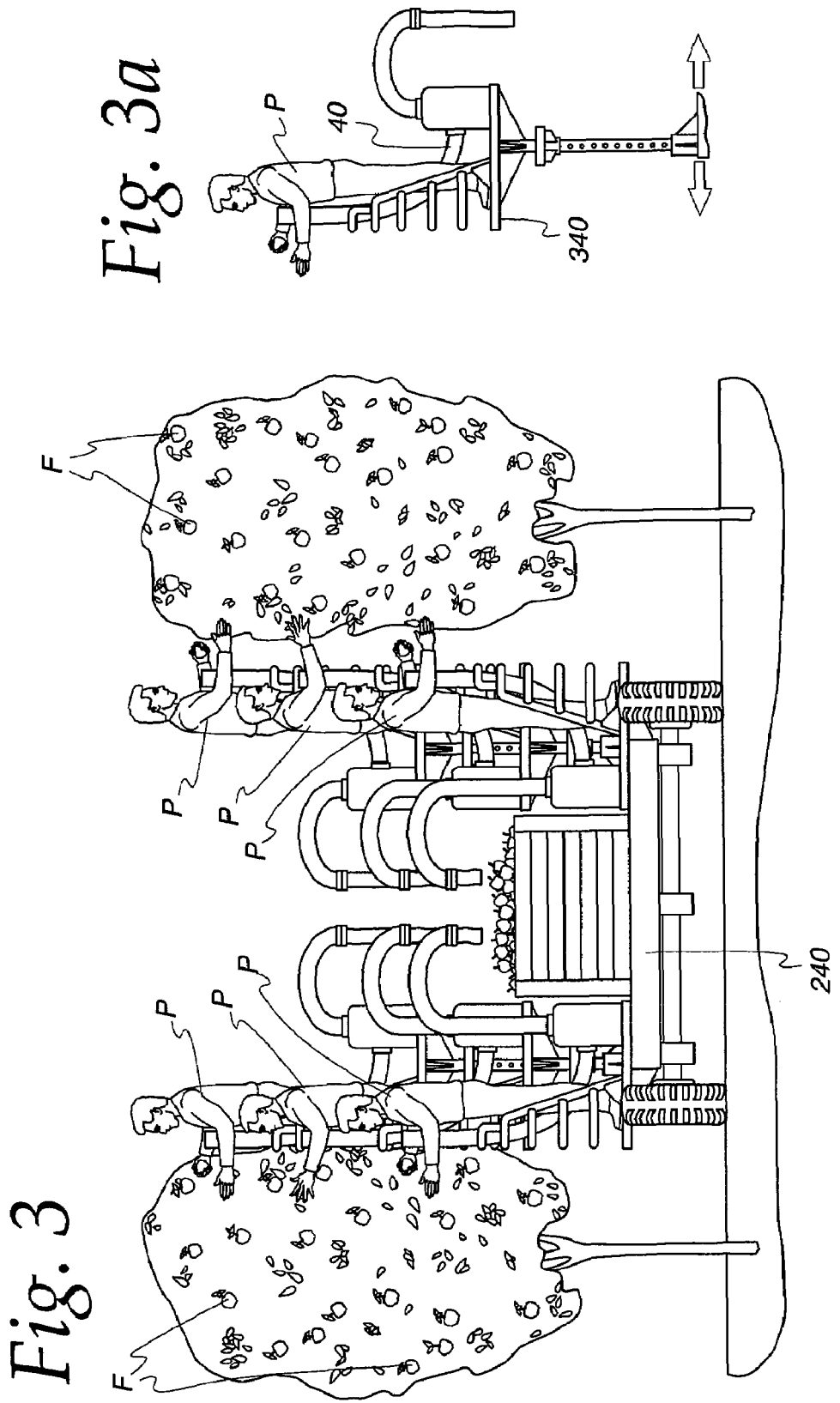
FIG. 3 is an elevational view similar to FIG. 1 but showing typical apple pickers and a trailer as they appear from the rear of the trailer.
Figure 4:
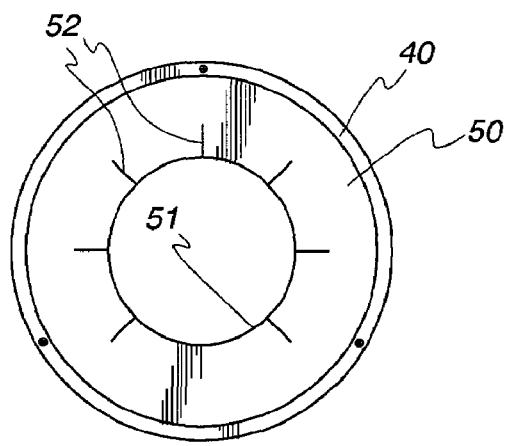
FIG. 4 is an elevational view of a typical baffle found within a transport tube.
Figure 5:
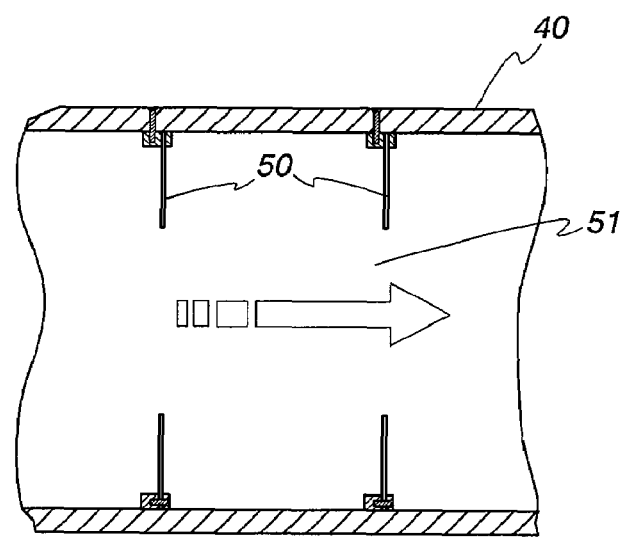
FIG. 5 is a sectional view of a typical transport tube and, mounted therein, the baffles of FIG. 4.

In one embodiment, the transport tube invention and its peripheral equipment are comprised of four parts or subsystems. These four subsystems act together to: a) surround and contain a selected fruit on the tree, vine or bush; b) release the fruit or other object from the parent tree or plant at the stem's natural point of release or by clipping the stem at a desired length; c) advance (move) the fruit gently yet quickly up and/or down and/or along a rigid or flexible tube pathway, and finally; d) deposit the fruit without bruising into a separate chamber, e.g., a water bath or rigid container.

a) In the "surround and contain" or entry portion of the device, a pneumatic tube 40 is provided with a rigid or flexible entry portal or input device 35 (FIG. 35) comprised of plastic, rubber or other suitable material. This entry device 35 can be of known design, or it can be a flexible drop chute as disclosed and informally claimed in co-pending U.S. provisional patent application 60/972,302 filed Sep. 14, 2007. This entry portal device 35 is placed under and around the fruit from the stemless end to the stem end (FIGS. 1-3). When the fruit is picked and separated from the tree, the portal device 35 receives the fruit from the picker and delivers it to the transport tube 40 (FIGS. 1-3, 3a). The surrounding chute structure 35 is dimensioned so as to allow entry by any given fruit of any size, is stiff enough so as to not collapse or disfigure the shape of the tube 40 by the weight or shape of the fruit throughout the course of its passage, or prolong the passage of the fruit through the hollow chute and tube structure.

b) The fruit or other objects to be picked are separated from the tree by hand, or with the aid of a clipper or scissors-like device. These scissors or clippers can be of known design, or they can be of the sort disclosed and informally claimed in U.S. provisional patent application Ser. No. 60/921,707 filed Apr. 4, 2007 or U.S. provisional patent application Ser. No. 60/949,533 filed Jul. 13, 2007. As indicated in those applications, the "release or clip" portion of the device can be a common scissor-like device. This clipper can be comprised of one or more partially rotatable, curved, arc-like metal or plastic members, and if desired they can be mounted to the entry portal device or tube near the entry portal. The rotatable blades may be either blunt or sharp. In one embodiment of the "release or clip" portion of the device, the fruit is separated by cutting the stem when the fruit is contained in the chute of entry portal 35, and the fruit drops down the tube for transport. In another embodiment of the "release or clip" portion of the device the blade members may be sharp and act like a knife to cut the stem at the desired length. In still another embodiment of the "release or clip" portion of the device, multiple blades may act as a scissor to cut the stem. The rotatable blades may be activated by either a visual/manual system or by a mechanical or electronic sensor when the fruit is properly positioned for fruit stem release from the tree stem. The rotatable blades may be powered by manual force, or pneumatic or other mechanically or hydraulically applied mechanisms.

Figure 6:
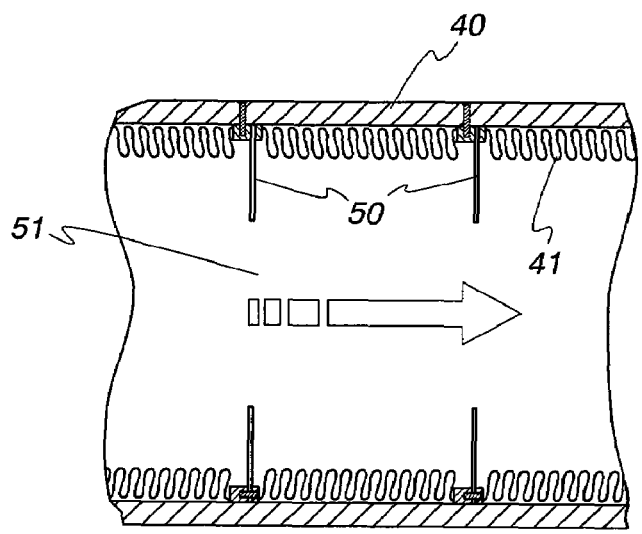
FIG. 6 is a sectional view of a typical transport tube similar to FIG. 5 but showing resilient material mounted between the baffles.
Figure 7:
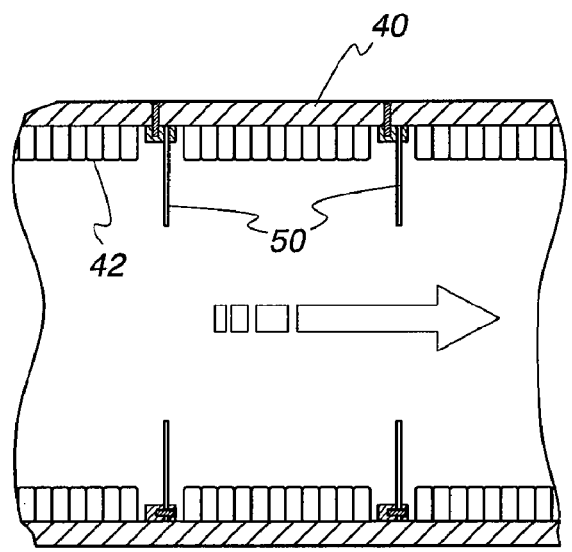
FIG. 7 is a sectional view similar to FIG. 6 but showing a different form of resilient material mounted between the baffles
Figure 8:
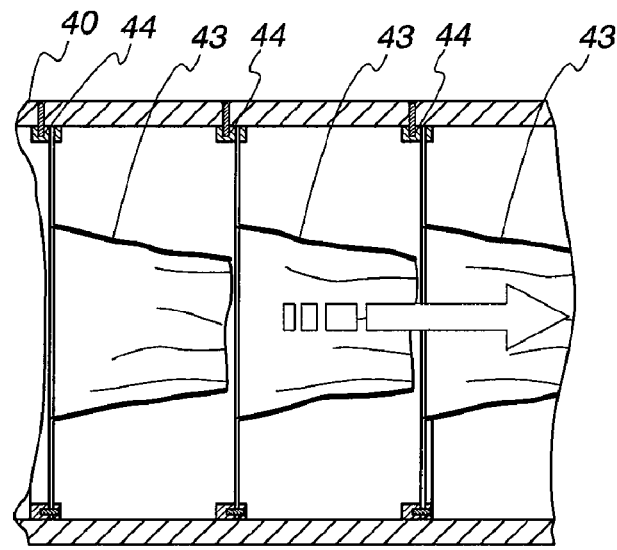
FIG. 8 is a sectional view similar to FIGS. 5, 6 and 7 showing a typical conical or windsock-shaped baffle.
Figure 9:
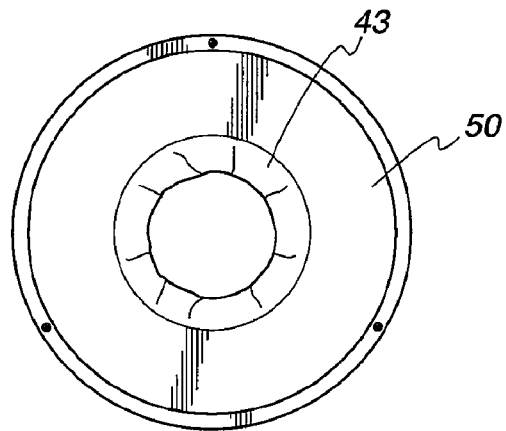
FIG. 9 is an elevational view of the baffle shown in FIG. 8.

The fruit can be picked by hand, of course—a lateral force sufficient to break the fruit portion of the stem from the tree can be manually applied.

c) In the "advance/move" portion of the device, the interior of the hollow or tubular portion 40 of the device can be lined with a soft or readily insertible and replaceable material liner 41 (FIG. 6), and a series of baffles, as more extensively disclosed and claimed below. Pneumatic pressure can be applied to the fruit or other object to be moved, as more fully described and claimed below.

d) The terminal downstream peripheral "deposit portion" of the tube is configured so as to gently deliver the fruit or other objects into either a water bath or rigid container. The tube downstream end may be directed to different location in a water bath (not shown) by hand or machine, or the tube 40 can be rigidly connected to the water bath container for delivery into a sufficiently deep current of water so that any particular fruit does not contact another fruit or the bottom of the container during the water entry process. In a first embodiment of the "deposit portion" of the device, the terminal portion of the tube is connected to a water bath container. In a second embodiment, the "deposit end" of the device is arranged for delivery of the fruit or other items into a rigid container or water bath, but a terminal baffle or cushion of soft material or inflatable material is positioned so as to absorb the force of the moving fruit without bruising it. Once decelerated, the fruit would exit the flexible tube through a lateral portal, either by moving the tube away from the direction of the fruit exit portal, or by gently pushing the fruit through the portal in the tube side. This pushing action could be provided by an inflatable device triggered mechanically, or it could be triggered electrically by the fruit hitting a terminal deceleration cushion.

Pneumatic Tubes for Moving Items

In 19th-century Europe, public and technical interest arose in the idea of so-called atmospheric railways. Original proposals called for the use of pneumatic tubes to carry letters, packages and even passenger trains, cars and freight. The train might be thought of as a series of car capsules or canisters into which people or items of an undetermined shape entered before being moved along as a result of an exterior force applied to the train cars. If a seal were to be created between the canister cars and the interior surface of the tunnel, the canister cars could be moved through the tube by providing relatively low pneumatic pressure at the forward end of the train and a relatively high pneumatic pressure at the rear end of the train. Later proposals suggested the use of a small pneumatic tube located alongside an ordinary railway track; a piston inside the tube would pull an attached train running on the rails. The ultimately successful alternative of pulling railway trains through tunnels or tubes behind steam locomotives was extensively developed during the same years. A copy of a descriptive article is in the file history of this patent application, and is available to the public.

In 1840, Samuel Clegg and Jacobs Samuda (British subjects) obtained U.S. Pat. No. 1,922 for the Construction of Valves for Pneumatic Railways. Implementation of that patent led to the successful movement of a train on wheels on a track positioned within a tube for a distance of one block. U.S. Pat. Nos. 255,525 and 284,456 disclose early pneumatic systems for so-called store service carriers.

The fundamental concept common to previous pneumatic systems for movement of items relies on one or more seal members affixed to the moving item. These seal members provide a pneumatic seal between the moving item and the interior surface of the tube. The item to be transported (which may be of any shape) is placed within a canister of predetermined shape. An exterior flange-like seal secured to the canister moves along with the canister through the tube. The seal continuously engages the interior surface of the tube so as to provide an air seal. This air seal permits the development of a pneumatic pressure differential in the tube between the upstream and downstream surfaces of the seal and capsule. The force of this air pressure differential propels the capsule and seal along the tube.

Pneumatic Transport or Movement Device

The object of this invention is to rapidly move items through a tube independent of the items' shapes without having to place the items into a capsule or canister of fixed shape. A means to create a seal sufficient to allow the pressurized system to advance the item through the tube is required. An embodiment of the new concept focuses on a sealing arrangement, but the seals do not move along through the tube. The sealing arrangement nevertheless can maintain a proper environment for effectively providing pneumatically induced movement of the item through the tube.

In accordance with the invention, a series of sealing baffles are affixed to the interior wall of the tube and can accommodate items of different sizes and shapes while maintaining a series of pneumatic seals between the sealing baffles and the items moving down the tube.

As suggested in FIGS. 1-3 and 3a, this pneumatic tube system can be used by individual pickers P. Each picker can have an input chute 35, which can be located and worn adjacent the picker's chest by a known and convenient harness means 503. The chute 35 leads to a pneumatic tube 40 which transports the picked fruit to a bin 140 or other collection device. If desired, the tube transport system and the pickers P can be mounted on a trailer 240 pulled by a tractor T as shown in FIG. 2. Alternatively, the systems and pickers can be mounted on a self-propelled vehicle as indicated in co-pending U.S. provisional patent application Ser. No. 61/028,351 filed Feb. 13, 2008, now co-pending utility application Ser. No. 12/371,446 filed Feb. 13, 2009 and entitled "Mobile System For Improving The Picking And Preliminary Processing Of Apples, Citrus, Stone Fruit And Like Objects." Or the systems can be mounted on a sled, a movable frame, or even a stationary pad.

To reach apples or other fruit at various heights in the trees, the pickers P can be provided with picking stations or platforms 340 as especially suggested in FIG. 3a. The positions of these stations 340 can be adjusted by known hydraulic or other systems as suggested by the arrows in FIG. 3a.

As shown in FIGS. 4-12 and elsewhere, one embodiment of the invention comprises a tube 40 which may be rigid or flexible and made of plastic, metal or other suitable material. The tube can be of circular, and/or any convenient cross-sectional shape. In accordance with the invention, a series of sealing baffles 50 are provided at spaced apart locations within the interior of the tube. Each baffle is affixed to the interior of the tube 40, is aligned in a perpendicular fashion relative to the tube axis, and is made of a resilient smooth-surface material such as a silicon rubber or resilient plastic. Preferably, the spacing between the baffles 50 is selected to be approximately the same as the major dimension of the items to be moved through the transport tubes. The system will perform but perhaps less effectively if the baffle-to-baffle distance is made to be substantially greater or less than this item's major dimension.

In an alternative embodiment of the invention, groups of closely-spaced multiple baffles may be located at major intervals along the tube interior.

Figure 13:
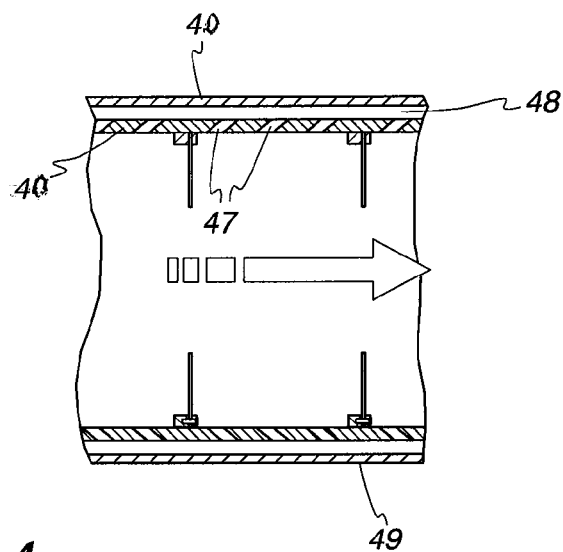
FIG. 13 is a fragmentary sectional view showing an embodiment of the invention including an outer tube, an inner transport tube, air movement spaces between the tubes, and baffles.
Figure 14:
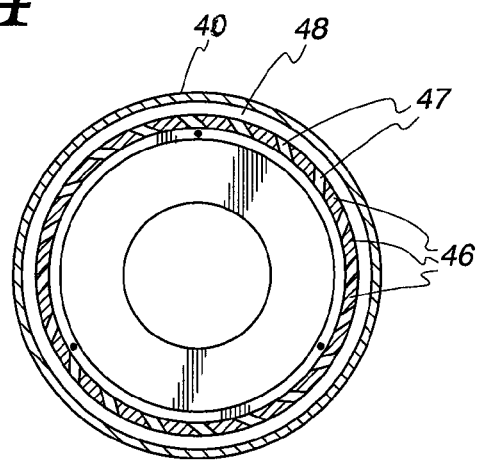
FIG. 14 is a sectional view of the tube and baffle arrangement shown in FIG. 13.
Figure 15:
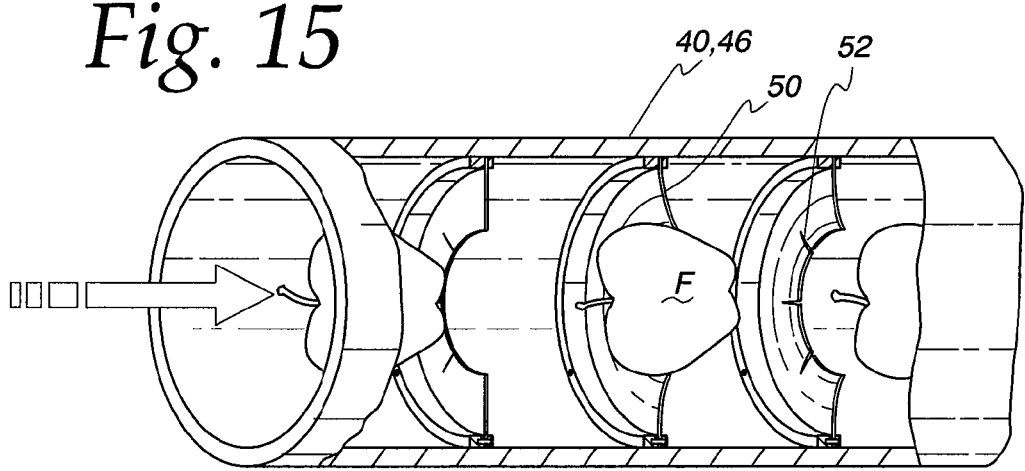
FIG. 15 is a fragmentary view in partial section suggesting the movement of typical objects such as apples through the inventive tube and baffles.
Figure 16:
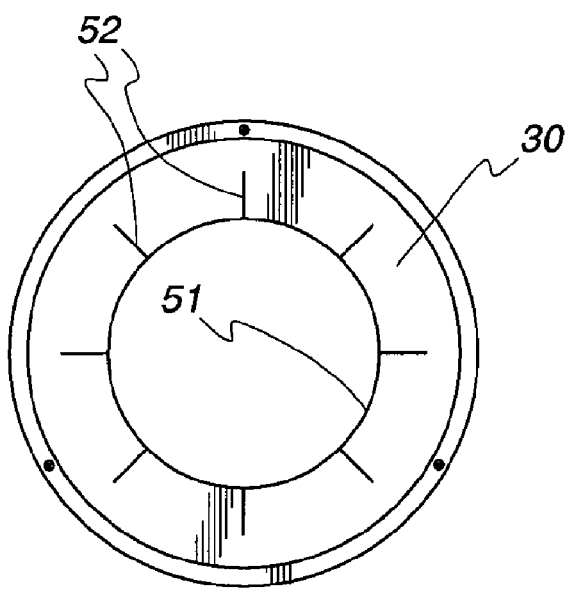
FIG. 16 is an elevational view showing a baffle of the type included in the tube shown in FIG. 15.
Figure 17:
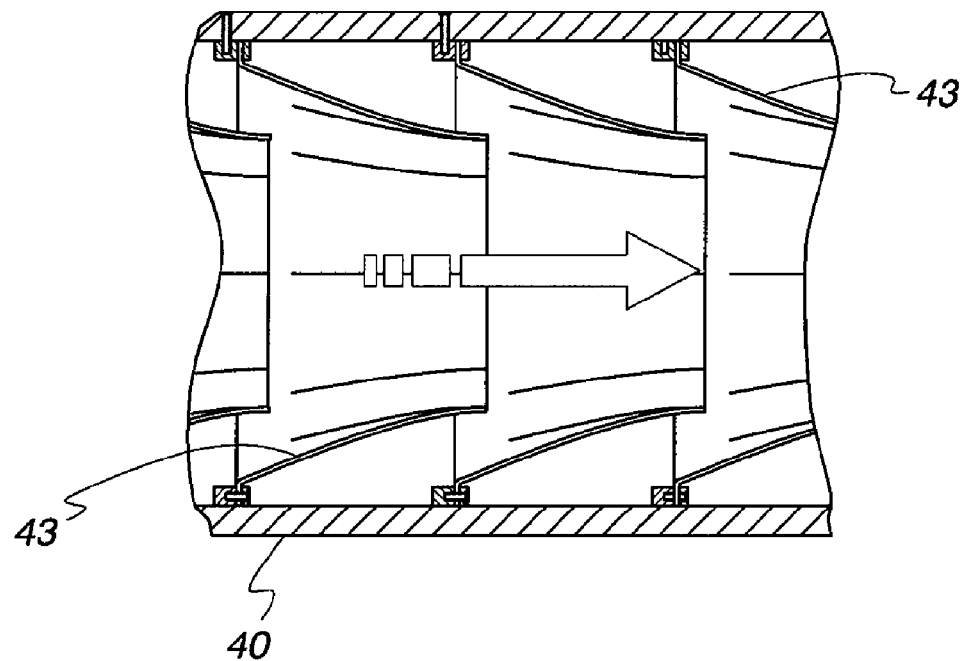
FIG. 17 is a fragmentary view in sectional aspect showing conical or windsock baffles within the transport tube.

Preferably, the baffles each define a central opening or hole 51. The outer periphery of the baffle, and the periphery of the hole 51, can be of any convenient shape such as circular, oval, elliptical, or other shape. As suggested in FIG. 15, the central opening 51 is of such diameter that an item F greater in diameter than the hole 51 but lesser in diameter than the tube can pass through the tube because of the elasticity of the baffle 50. As suggested in FIGS. 13, 14, 15 and elsewhere, the baffles 50 can be spaced apart from one another by a distance substantially equal to the diameter of the baffle aperture or hole 51. The baffle 50 may have slits 52 extending from the central opening into the baffle material to facilitate its opening to accommodate a relatively loose item F passing through it. If small items F are to be moved, the slits 52 may not be needed. Alternatively, the baffles 50 can be inflatable. The material comprising the inflatable baffles can be shaped and arranged so that progressive inflation of the baffle will provide a progressively smaller opening 51, or the shape of the opening 51 will be progressively changed in some other way.

The baffle 50 may have slits 52 extending from the central opening into the baffle material to facilitate its opening to accommodate a relatively loose item F passing through it. If small items F are to be moved, the slits 52 may not be needed. Alternatively, the baffles 50 can be inflatable. The material comprising the inflatable baffles can be shaped and arranged so that progressive inflation of the baffle will provide a progressively smaller opening 51, or the shape of the opening 51 will be progressively changed in some other way.

Throughout the time of engagement of the item in the central opening of the baffle, a more or less imperfect pneumatic seal is temporarily made between the object and the baffle surface. When the pneumatic system (vacuum or air pressure) pulls and or pushes it free from an upstream baffle, the item rapidly advances to the next baffle opening where the phenomenon is repeated for the full length of the baffle segmented tube.

To minimize any traumatic effect on the item F being moved through the tube 40 in further accordance with the invention, the interior of the tube surface located between the resilient periodic baffle members 50 may be lined with a soft material 41 such as a soft rubber or resilient plastic. Alternatively, a series of many soft cushions such as outcroppings of small flexible finger-like extensions 42 or a soft inflatable air-filled balloon-like interior wall liner can be provided between the baffles as particularly suggested in FIGS. 6, 7 and 24-26.

An alternatively shaped baffle arrangement is shown in FIGS. 8, 9, and 15-17. There, conical or windsock-shaped baffles 43 are attached by a fixation device 44 on the interior surface of the tube. The windsock baffles 43 can be made of a material which may be woven or formed of a resilient material such as rubber or resilient plastic. The material may be of such a nature that it may collapse onto the surface of the item being moved through it while at the same time allowing the item to advance with minimal impedance. These interior windsocks 43 can be spaced apart from one another such that the item, on leaving one windsock baffle 43, will at that moment be delivered into the next overlapping windsock baffle 43 in the series as particularly suggested in FIG. 8, thus maintaining a continuous seal as the item moves down the tube.

Several variations of these baffles 50 are shown in FIGS. 30-34. The baffles 50 may have a disc shape as suggested in FIG. 30, or it may have a generally conical shape, as suggested in FIG. 31. This conical shape will help orient the moving object in the central axis of the tube and baffle. Alternatively, the baffles 50 may have a modified conical shape as suggested in FIG. 32. This shape may provide a venturi-like effect to the airflow passing through the baffles 50. The disc 50 may have guide plates 54 as suggested in FIGS. 33 and 34.

The tubes 40 illustrated here can comprise an outer tube 45 and a coaxial inner tube 46 having apertures 47 therein. This tube arrangement permits the creation of an air 315 flow liner 46 thereby facilitating the maintenance of the object moving through the tube in a more central position in the tube 40, while at the same time placing an axially extending air space 48 between individual objects F which may be moving through the tube 40 at the same time. Additionally this arrangement will allow for the effect of either vacuum or positive air pressure applied to the tube to reach more than one item moving through the tube at the same time.

Other means of achieving similar effect(s) can be accomplished by having air movement portals periodically and circumferentially placed in the tube. As suggested in FIGS. 9-12 and elsewhere, peripheral air movement occurs through the space 48 between the outer tube 40 and the baffle-containing inner tube 49 while at the same time central air movement is occurring through the inner tube 49. These portals may be of the same or different diameters, and aligned either perpendicular to the inner tube surface or at the same or varied angles to achieve the desired effect(s). The tubes 40 and 49 may be rigid or flexible.

Figure 10:
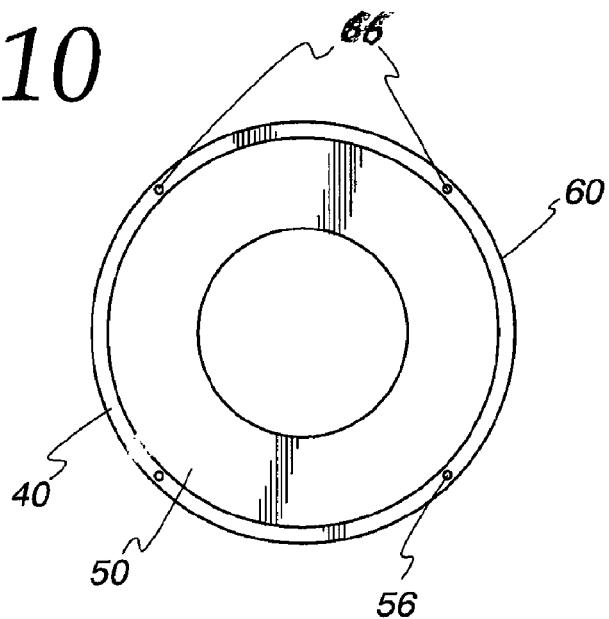
FIG. 10 is an elevational view of an alternate form of a baffle.
Figure 11:
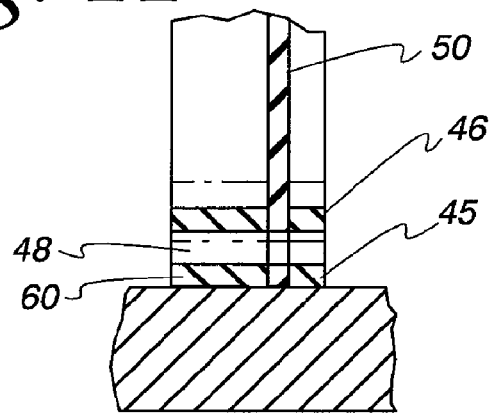
FIG. 11 is a fragmentary view showing, in section, an alternate arrangement of the tube and baffles shown in FIG. 7 or 8 and 10.
Figure 12:
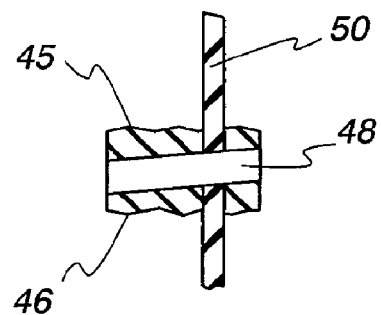
FIG. 12 is an enlarged fragmentary view showing in further detail the arrangement of a baffle and air holes shown in FIG. 11.

A retainer ring 60 is shown in FIGS. 10 and 11, wherein the retainer ring 60 is perforated by peripheral holes 66 which may be of different diameters and either perpendicular to or angled in any direction with relationship to the surfaces of the retainer ring 60. These holes 66 allow for the passage of air from one inter-baffle space to another.

As suggested above, modified airflow and air pressures within the tubes can be provided by an arrangement of a coaxially aligned outer tube 45 and an inner tube 46 (FIGS. 10-14). The toridal-shaped space 48 between the tubes 45 and 46 allows air to be exhausted along the entire length of a tube line. Portals 47 can be provided to inject or exhaust air so as to provide the desired positive or negative pressures for urging the objects F along the tubes in accordance with the invention. These passages 47 can be formed so as to provide a helical air flow as suggested especially in FIG. 14. This helical air flow may discourage the moving objects F from violently impacting the inner tube sides and consequently suffering bruising or other damage.

Figure 18:
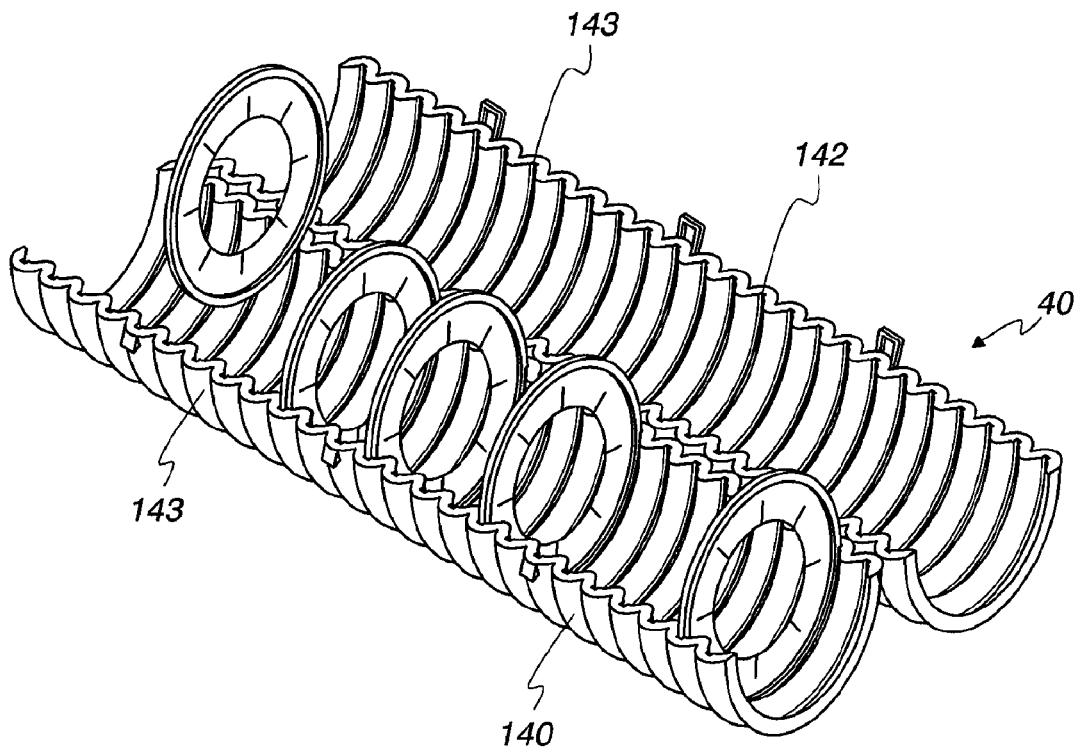
FIG. 18 is an isometric view showing how one embodiment of the transport tube and baffles can be assembled.
Figure 18A:
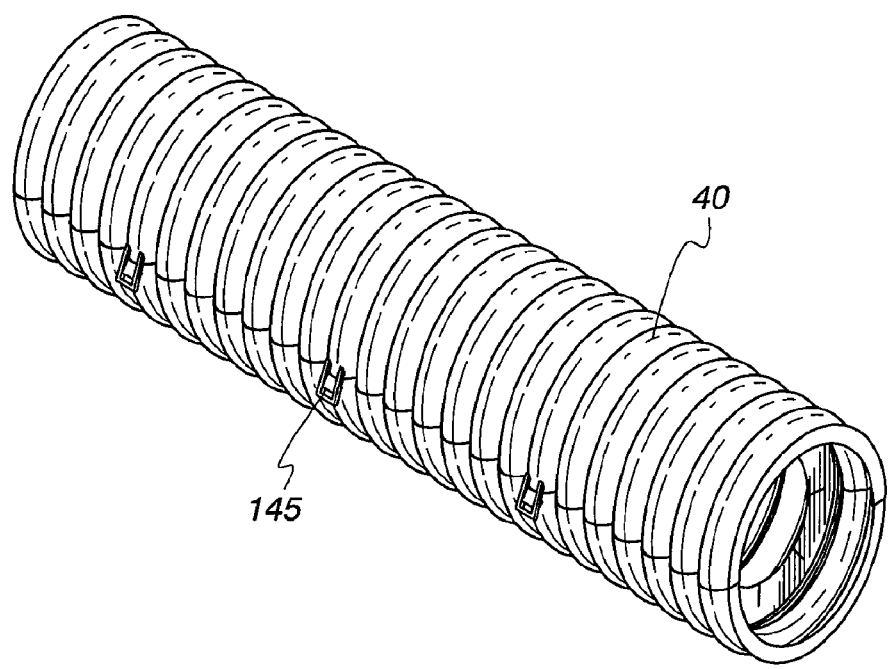
FIG. 18a is an isometric view showing the tube of FIG. 18 in its assembled configuration.
Figure 19:
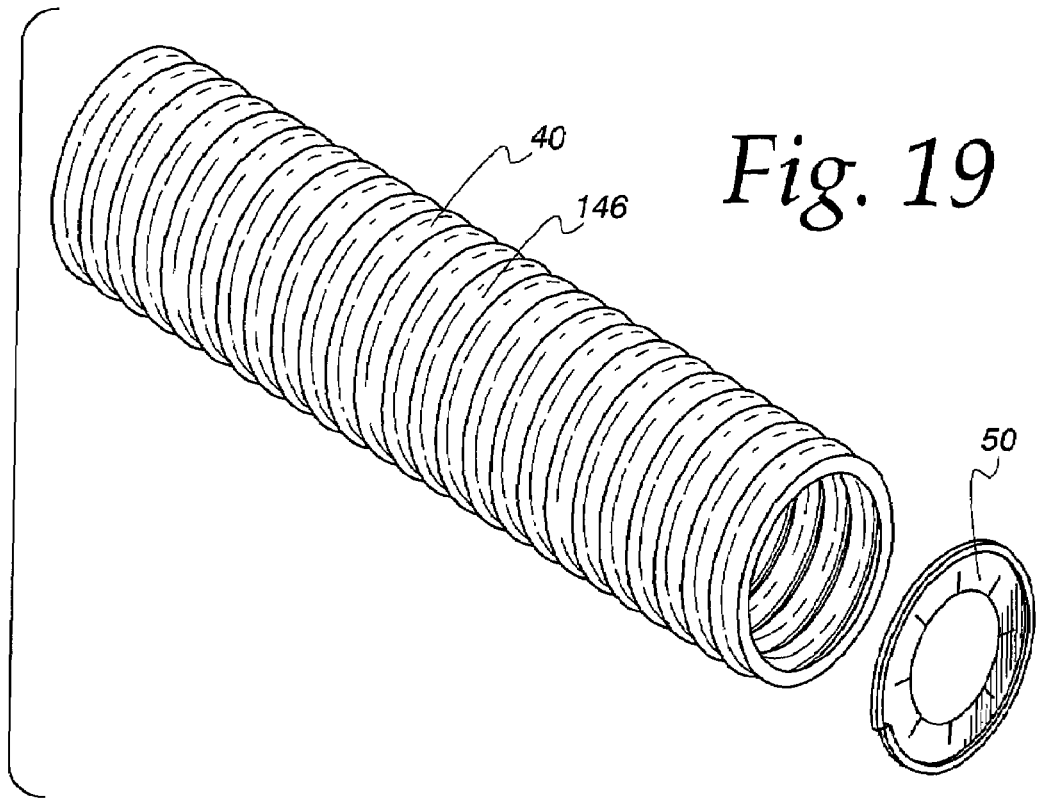
FIG. 19 is in isometric view similar to FIG. 18 but showing how another embodiment of the transport tube and baffles can be assembled.
Figure 19A:
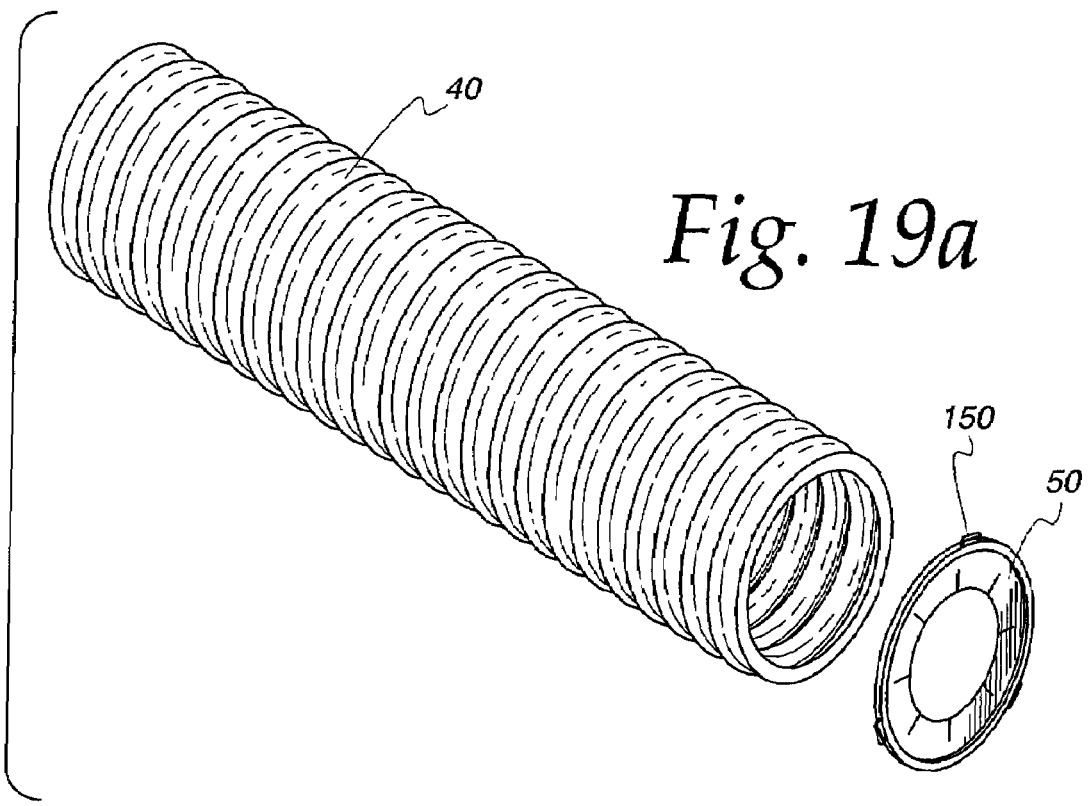
FIG. 19a is an isometric view similar to FIG. 19 but showing how yet another embodiment of the transport tube and baffles can be assembled.
Figure 20:
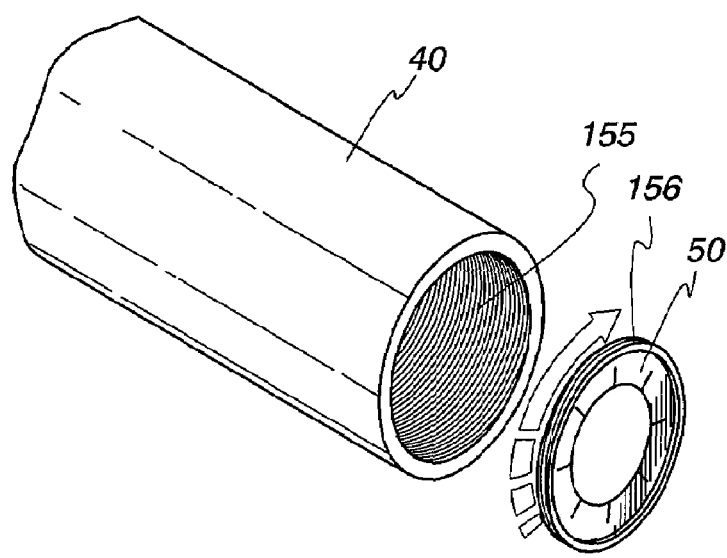
FIG. 20 is in isometric view similar to FIGS. 18 and 19 showing how still another embodiment of the transport tube and baffles can be assembled.
Figure 21:
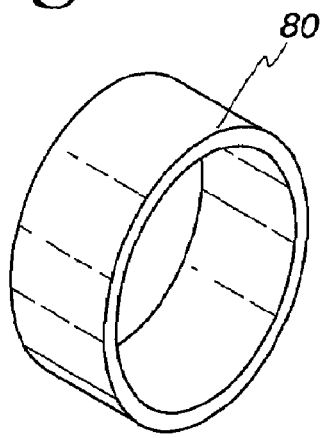
FIG. 21 is an isometric view showing a spacer which can be positioned between adjacent baffles.

The construction and assembly of the tubes, baffles and inner liners or spacers is suggested in FIGS. 18-26. Tube halves 140, 142, can be formed with mating corrugated shapes 143, and the baffles 50 can be nested at desired spacing within the corrugations as suggested in FIG. 18. The tube halves can then be assembled and locked together with suitable clamp locks 145 as suggested in FIG. 18a. Alternatively, unitary tubes 40 can be provided with a spiral corrugation 146 as shown in FIG. 19, and the spacers 50 can be mounted within the tube by a helical, screwing-like motion. Locking tabs 150 can be provided on the baffles 50 to mate with recesses (not shown) within the tube 40 as suggested in FIG. 19a. In yet another alternative arrangement, the tube 40 can be provided with an extended series of threads 155, and the baffles 50 can be provided with mating threads 156, as suggested in FIG. 20.

Figure 22:
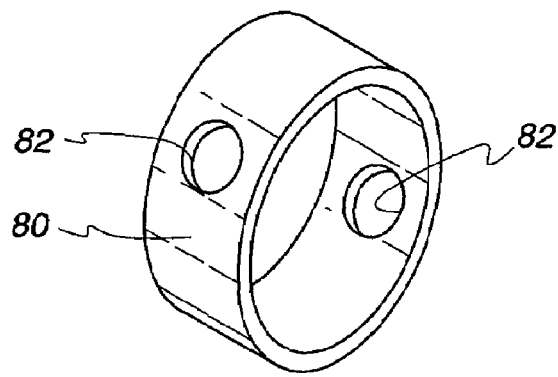
FIG. 22 is an isometric view similar to FIG. 21 but showing a spacer provided with two exhausts or viewing ports.
Figure 23:
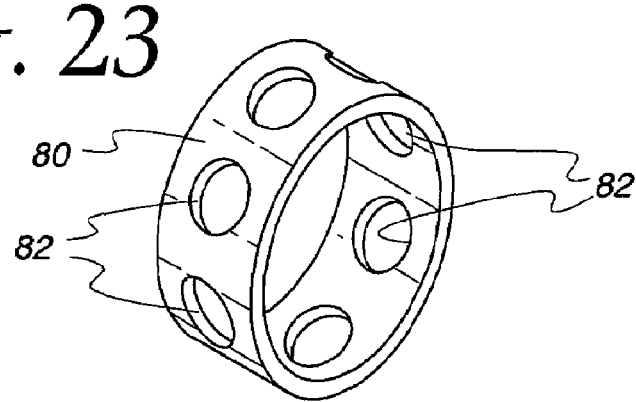
FIG. 23 is an isometric view similar to FIG. 22 but showing a spacer provided with multiple exhausts or viewing ports.
Figure 24:
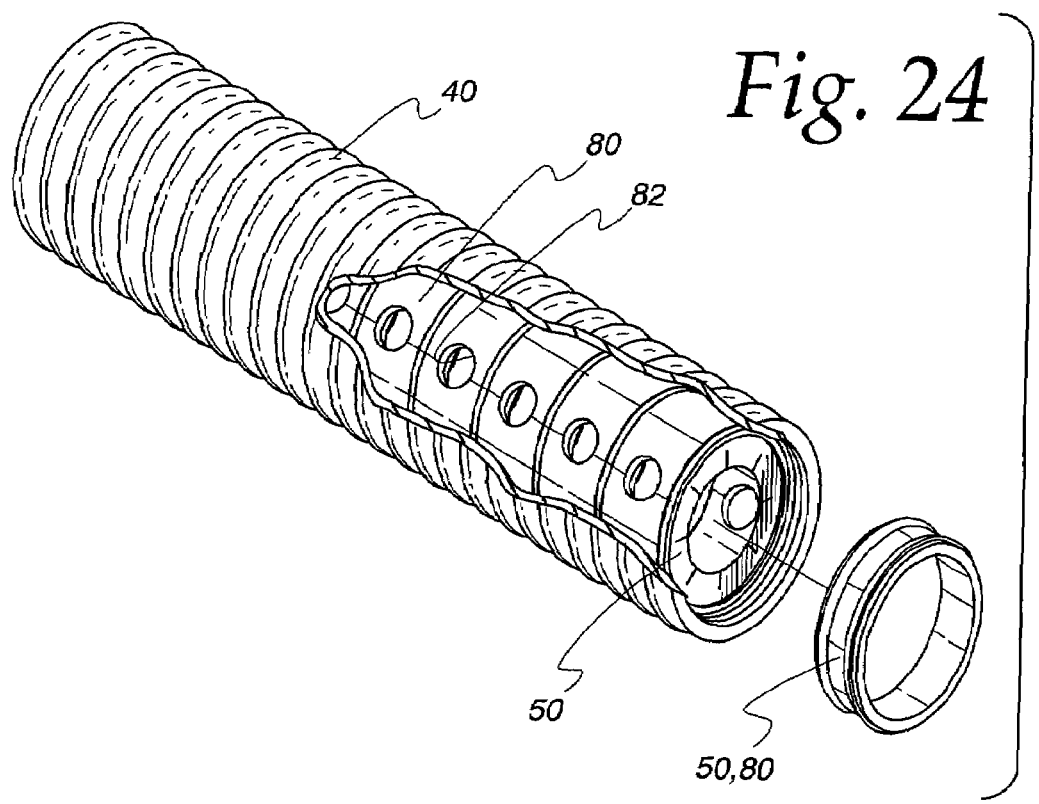
FIG. 24 is an isometric exploded view showing the tube, spacers and baffles shown in FIGS. 19-23.
Figure 24A:
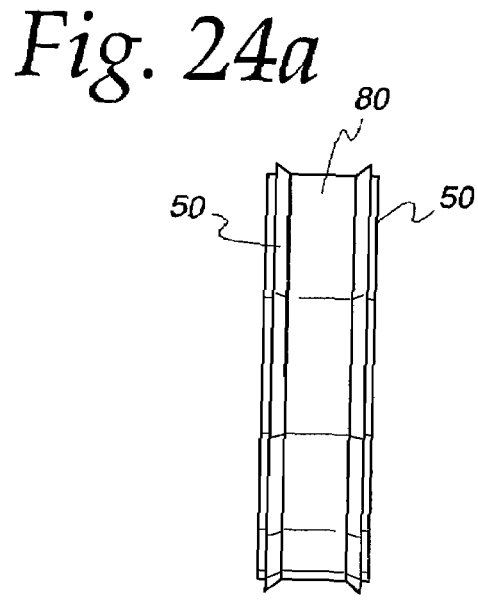
FIG. 24a is an elevational view showing a combination spacer and baffle of the type shown in FIG. 24.
Figure 25:
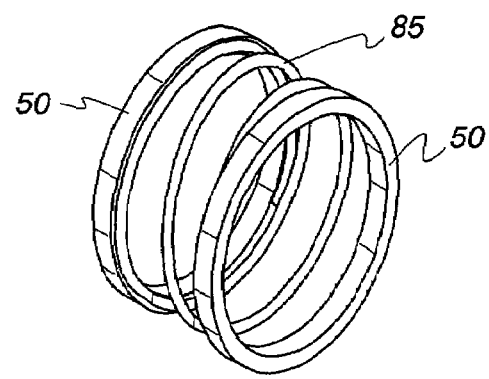
FIG. 25 is an isometric view of yet another spacer.

Spacers 80 (FIG. 21) can be made of soft material and can be located between the baffles 50. These spacers 80 can be provided with ports 82 (FIGS. 22 and 23). If the tube 40 is made of transparent material such as plastic, these ports 82 can be used to view and inspect the interior of the tube system. Alternatively, these ports 82 can provide the desired airflow if the tube system is provided with the coaxial tube arrangement described above. See FIG. 24. If desired, these spacers and baffles can be made as a single unit. See FIG. 24a. To mate with a helically corrugated tube, this spacer may be provided with a spring-like helix member 85 as suggested in FIG. 25.

Figure 26:
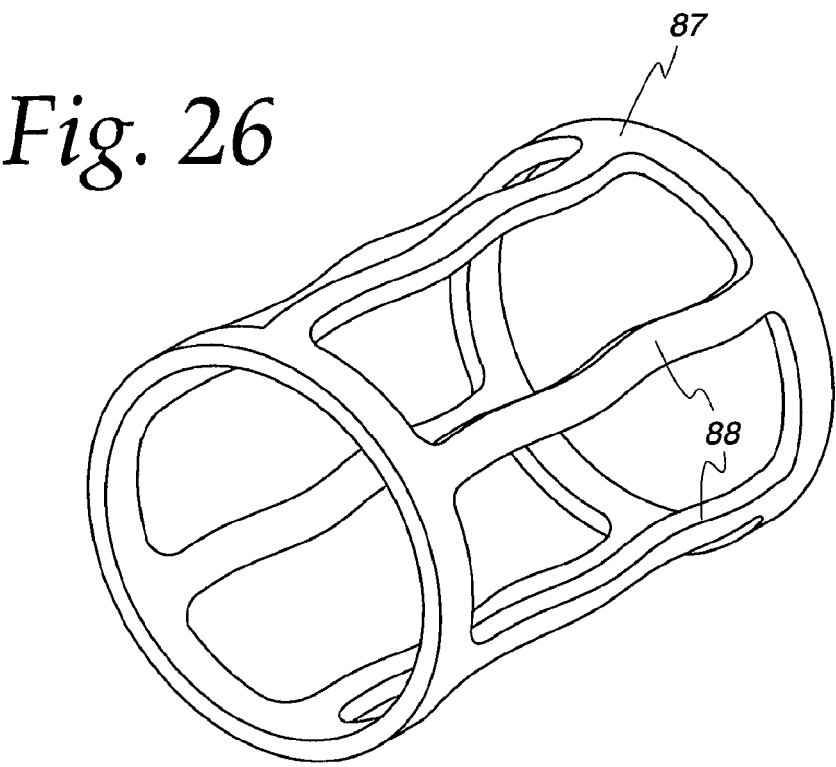
FIG. 26 is isometric view showing still another spacer.

An alternatively designed spacer 87 is shown in FIG. 26. This spacer is formed of soft, pliable material which will conform to the inner surface of a tube, whether corrugated or planer. Spaced apart arms 88 prevent the transported object from colliding with the rigid tube wall, but the spacing between these items 88 minimizes impedance to object travel.

Figure 27:
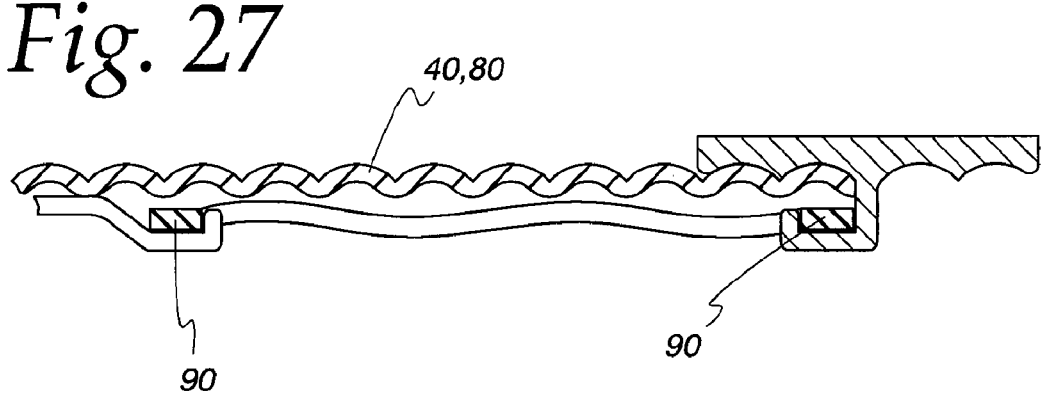
FIG. 27 is a fragmentary sectional view suggesting a structural arrangement which can be used to interconnect various tube sections.
Figure 28:
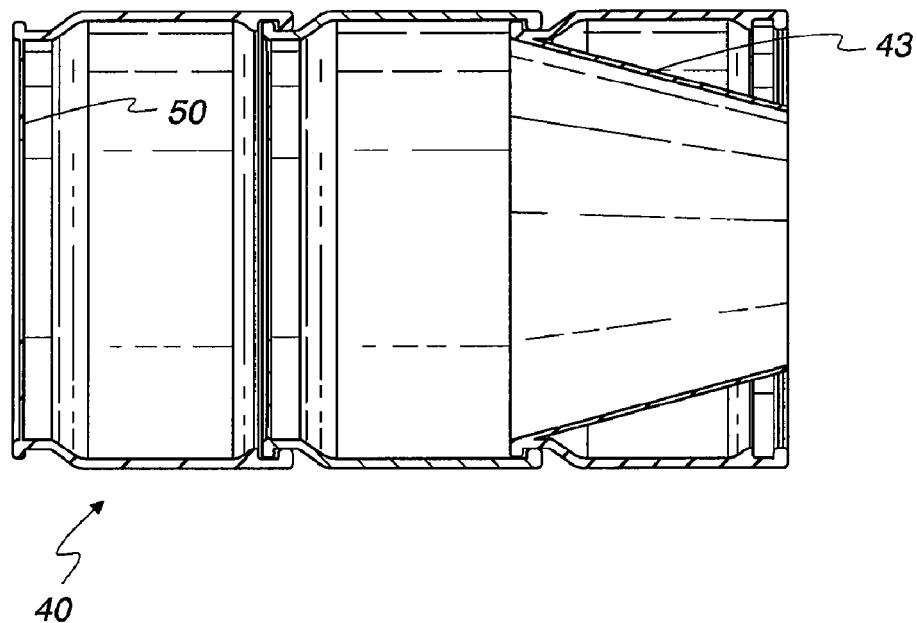
FIG. 28 is an elevational view of an air exhaust venturi mechanism.
Figure 29:
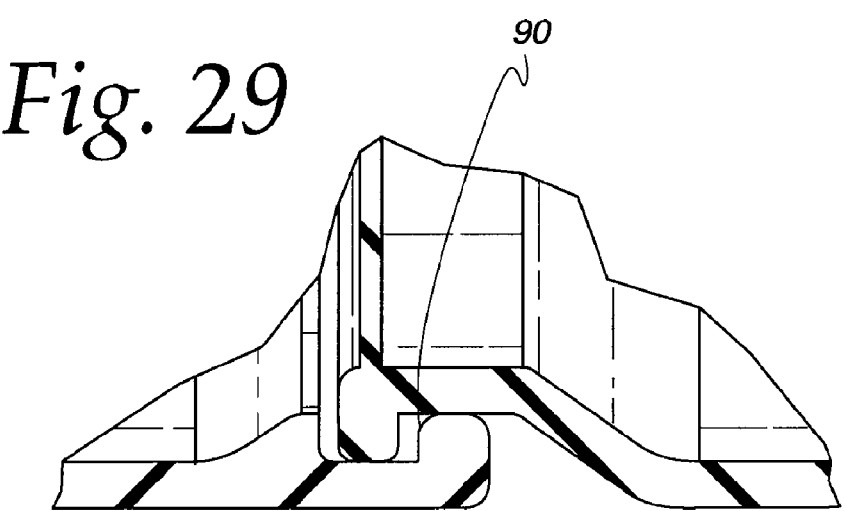
FIG. 29 is a fragmentary sectional view of a portion of FIG. 28.
Figure 30:
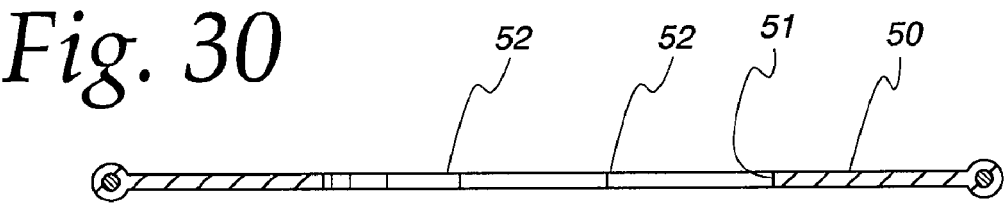
FIG. 30 is a sectional view of a disk-shaped baffle.
Figure 31:
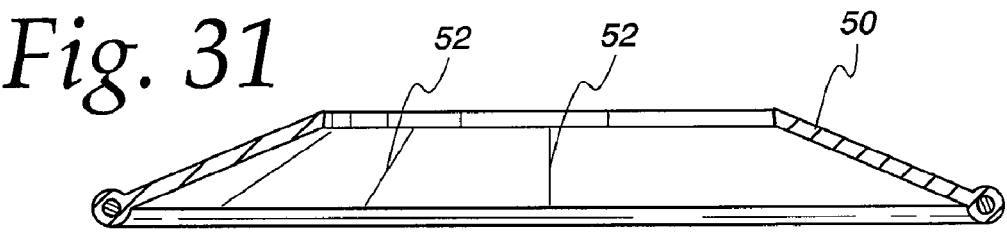
FIG. 31 is a sectional views similar to FIG. 30 but showing a conically shaped baffle.
Figure 32:
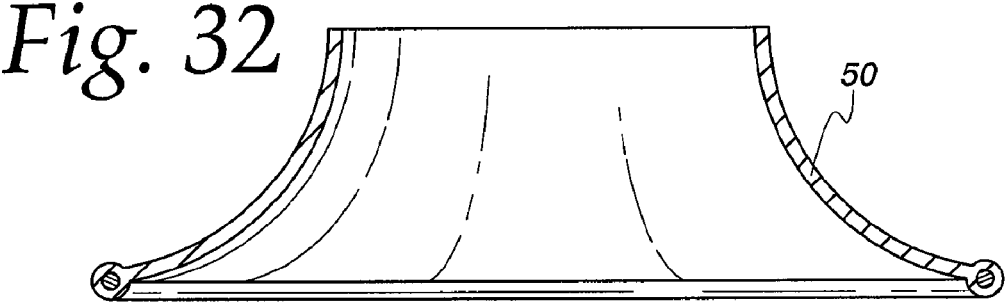
FIG. 32 is a sectional view similar to FIGS. 30 and 31 but showing another embodiment of the conical baffle.
Figure 33:
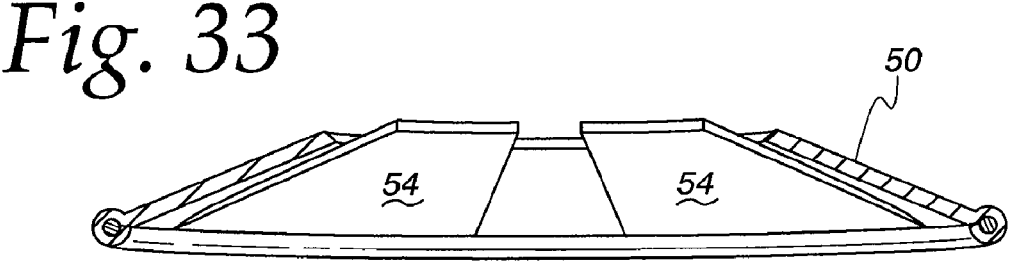
FIG. 33 is a sectional view similar to FIGS. 30-32 but showing yet another embodiment of the baffle.
Figure 34:
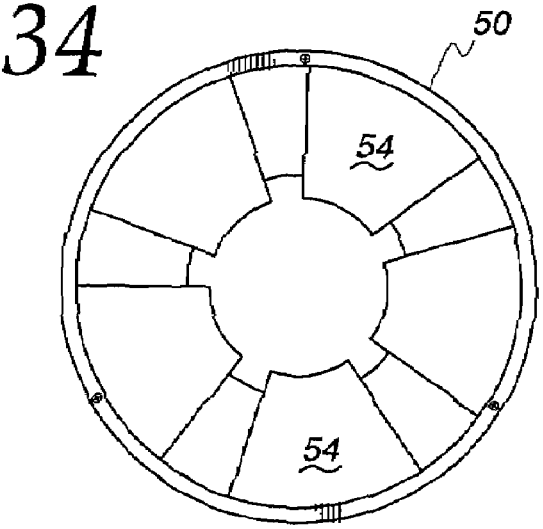
FIG. 34 is an elevational view of the baffle shown in FIG. 33.

FIGS. 27-29 suggest one of several known arrangements for interconnecting tube length modules. The tube sections can be snapped together by hand or with tools to form a flexible tube assembly. The joints 90 are self-sealing but slide to provide flexibility.

Figure 35:
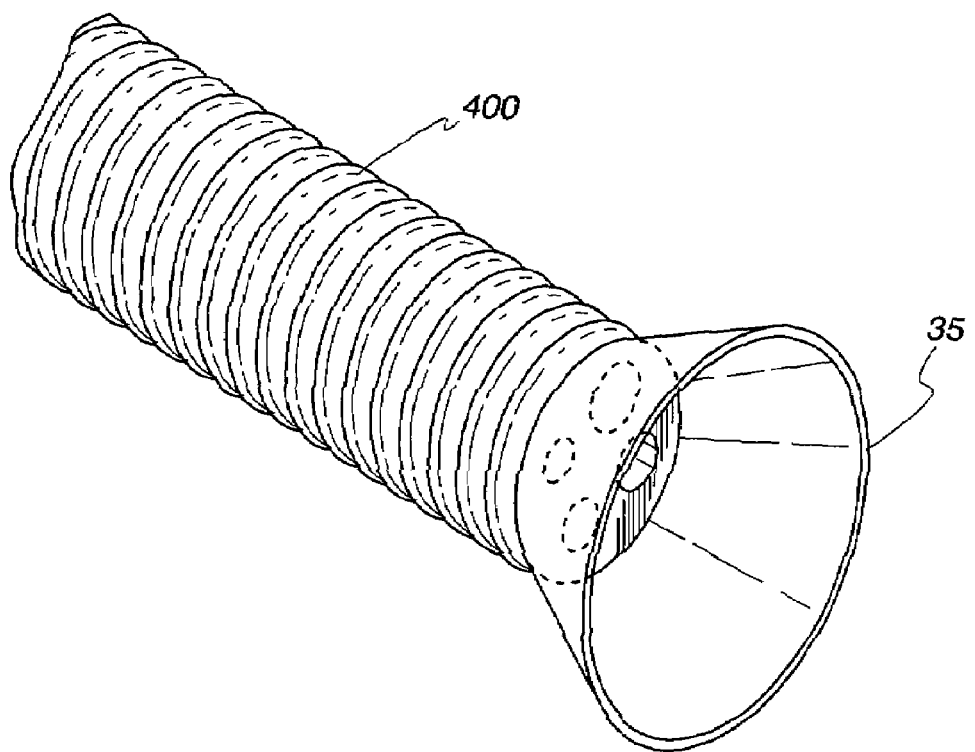
FIG. 35 is a fragmentary elevational view showing yet another embodiment of the transport tube and an associated input device.

If desired, a series of transport tubes can be carried within a relatively large conduit 400, as suggested in FIG. 35. The conduit 400 can be equipped with a delivery chute 35 so that the picker can place objects of varying sizes in tubes of appropriate and corresponding diameter.

We claim:
1. A device for transporting articles, comprising:
   a tube member adapted to receive and transport articles;
   a pneumatic system for causing a pressure differential across the article being transported as the article moves through the device; and
   a plurality of unslitted, unslotted deformable baffles at spaced-apart locations throughout the length of the tube, each baffle defining an aperture through which the transported article can pass, wherein adjacent baffles are spaced apart by a distance approximately equal to the diameter of the baffle aperture.

2. A device according to claim 1 wherein the baffle aperture is smaller than the article being transported, but permits the transported article to engage and deform the baffle and aperture so as to permit the article to move through the aperture.

3. A device according to claim 1 further including a cutter for separating the article from a plant.

4. A device according to claim 1 wherein said tube member comprises an inner tube and an outer tube coaxially aligned with but radially spaced apart from the outer tube to provide an air flow space between the tubes.

5. A device according to claim 1 further including at least one liner member located between adjacent baffles.

6. A device according to claim 1 wherein the device is mounted upon a mobile platform.

7. A device according to claim 1 further including a chute mounted at an entry end of said tube member, the chute being adapted to receive an article to be transported and to deliver the article to a tube entry end.

8. A device according to claim 7 wherein said chute is flexible and is generally conical in shape.

9. A device according to claim 7 wherein said chute includes means permitting a picker to wear the chute.

10. A device according to claim 1 wherein said tube member has a corrugated interior surface.

11. A device according to claim 10 wherein said corrugated interior surface is helical.

12. A device according to claim 11 wherein said baffles are adapted to be screwed into said helical corrugation into predetermined positions.

13. A device according to claim 1 wherein said tube member comprises two U-shaped tube halves.

14. A device according to claim 13 further including locking means for securing the tube halves together in confronting relationship.

15. A device according to claim 1 further including at least one spacer located between adjacent baffles, the spacer having an aperture permitting the condition of the tube member interior to be viewed.

16. A device according to claim 1 further including at least one inflatable wall liner located between adjacent baffles.

17. A device according to claim 1 wherein said baffle is conical in shape.

18. A device according to claim 1 further including a plurality of flexible baffles of generally conical shape and having axial lengths of predetermined extent.

19. A device according to claim 1 wherein said tube member includes at least one rigid section.

20. A device according to claim 1 wherein said tube member includes at least one flexible section.

21. A device according to claim 1 wherein said tube includes a corrugated outer surface.

22. A method of transporting an article through a tube having unslitted, unslotted baffles therein which are spaced apart throughout the length of the tube by a distance approximately equal to the diameter of the baffle aperture, the method comprising the steps of:
receiving an article in a tube upstream end;
creating a pressure differential across the article within said tube so as to cause said article to move and continuously sequentially engage the baffles through said tube; and depositing the article in a predetermined location after the article is delivered to a downstream tube end.

23. A method of transporting an article through a tube according to claim 22 further comprising the step of sequentially engaging said article by one baffle after another as said article passes through said tube.

24. A method of transporting an article through a tube according to claim 22 further comprising the step of deforming at least one of said baffles as said article passes through said baffle.

25. A combination comprising:
a bi-ended tube member adapted to receive and transport articles;
a pneumatic system for creating a pressure differential between the tube ends;
a plurality of apertured but unslitted, unslotted deformable baffles at axially spaced-apart locations throughout the length of the tube;
wherein the baffles are adapted to at least partly engage the surface of an article being transported so as to encourage the development of at least a momentary pressure differential across the article being transported as the article moves through the tube, and thereby advance the article through the baffle and along the tube to the next baffle.

26. The combination according to claim 25 wherein at least one said baffle is disk-shaped having an axial dimension less than its radial dimension.

27. The combination according to claim 25 wherein said at least one said baffle is a planar ring.

28. A device for transporting articles, comprising:
a tube member adapted to receive and transport articles;
a pneumatic system for causing a pressure differential across the article being transported as the article moves to the device; and
a plurality of unslitted, unslotted deformable baffles at spaced-apart locations throughout the length of the tube, each deformable baffle defining an aperture through which the transported article can pass, wherein said deformable baffle is adapted to create a pressure seal between the baffle and the article being transported through the baffle, and wherein the adjacent baffles are spaced apart by a distance approximately equal to the diameter of the baffle, so that the article passing through the baffle is passed substantially continuously from one sealing baffle engagement to the next sealing baffle engagement.

29. A method of transporting an article through a tube having apertured but unslitted, unslotted baffles therein which are spaced apart through the length of the tube by a distance approximately equal to the diameter of the baffle aperture, the method comprising the steps of:
receiving an article in a tube upstream end; and thereafter
creating a seal between the article being transported and a baffle so as to create a pressure differential across the article being transported along the tube and through the baffle, the pressure differential across the article consequently urging the article through the baffle and toward the next baffle within the tube so as to cause said article to move and sequentially engage the baffles in said tube with a sealing engagement.

30. A combination comprising:
a bi-ended tube member adapted to receive and transport articles;
a pneumatic system for creating a pressure differential between the tube ends;
a plurality of apertured but unslitted deformable baffles at axially spaced apart locations throughout the length of the tube, the baffle spacing being substantially equal to the diameter of the baffle aperture; the baffles being adapted to at least partly engage the surface of an article being transported so as to encourage the development of at least a momentary pressure differential seal across the article being transported as the article moves through the baffle and thereby advance the article along the tube to the next baffle.

31. A device for transporting articles, comprising:

a tube member adapted to receive and transport articles;

a pneumatic system for causing a pressure differential across the article being transported as the article moves through the device; and a plurality of apertured deformable baffles at spaced-apart locations throughout the length of the tube, each baffle defining a single aperture through which the transported article can pass, wherein adjacent baffles are spaced apart by a distance approximately equal to the diameter of the baffle aperture.

32. A combination comprising:

a bi-ended tube member adapted to receive and transport articles;

a pneumatic system for creating a pressure differential between the tube ends;

a plurality of apertured but unslitted, unslotted deformable baffles at axially spaced-apart locations throughout the length of the tube;

wherein the baffles are adapted to at least partly engage the surface of an article being transported so as to encourage the development of at least a momentary pressure differential seal across the article being transported as the article moves through the tube, and thereby advance the article through the baffle and along the tube to the next baffle, the baffles being spaced apart from one another within the tube by a distance approximately equal to the diameter of the baffle aperture so that the article being transported is substantially continuously engaged by at least one baffle so as to develop a pressure differential across the baffle and the article moving through that baffle.

* * * * *